DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 6

T951,003

PROCESS FOR DECREASING FLAMMABILITY OF POLYESTER CARPETS

Russell Gilkey, 1704 Springfield Ave., and Sarah Joelle Thomsen, 404 Highridge Road, both of Kingsport, Tenn. 37660

Filed July 24, 1975, Ser. No. 598,599
Int. Cl.[2] D06P 5/04
U.S. Cl. 8—17
No Drawing. 6 Pages Specification Disclosed is a process for decreasing the flammability of polyester carpets by dyeing a yarn of a polyester fiber in a dye bath containing a nonionic surfactant having a cloud point greater than 90° C.

Nonylphenol-ethylene oxide condensate with 30 to 50 ethylene oxide groups is one of these non-ionic surfactants used.